United States Patent [19]

Frieder, Jr. et al.

[11] 4,132,861
[45] Jan. 2, 1979

[54] HEADSET HAVING DOUBLE-COIL EARPHONE

[75] Inventors: Leonard P. Frieder, Jr., Dalton; Benjamin T. Cochran, Clarks Summit, both of Pa.

[73] Assignee: Gentex Corporation, Carbondale, Pa.

[21] Appl. No.: 819,252

[22] Filed: Jul. 27, 1977

[51] Int. Cl.² ............................................. H04M 1/19
[52] U.S. Cl. ........................... 179/1 P; 179/115.5 DV; 179/156 A
[58] Field of Search ................. 179/1 MN, 115.5 DV, 179/156 R, 1 P

[56] References Cited
U.S. PATENT DOCUMENTS 2,946,862  7/1960  Wadsworth et al. ............ 179/182 R
3,098,121  7/1963  Wadsworth ...................... 179/1 P Primary Examiner—William C. Cooper
Attorney, Agent, or Firm—Shenier & O'Connor

[57] ABSTRACT

A headset for use in a voice communication system which provides a common audio signal, such as a radio receiver signal, to a plurality of such headsets. The headset includes an earphone having a double voice coil and an ambient sound microphone arranged to receive sounds from the surrounding environment. One of the voice coils is coupled to the common audio signal, while the other coil receives a signal from the ambient sound microphone to permit simultaneous monitoring of the two signals while preventing undesirable signal interaction.

5 Claims, 3 Drawing Figures

U.S. Patent  Jan. 2, 1979  4,132,861
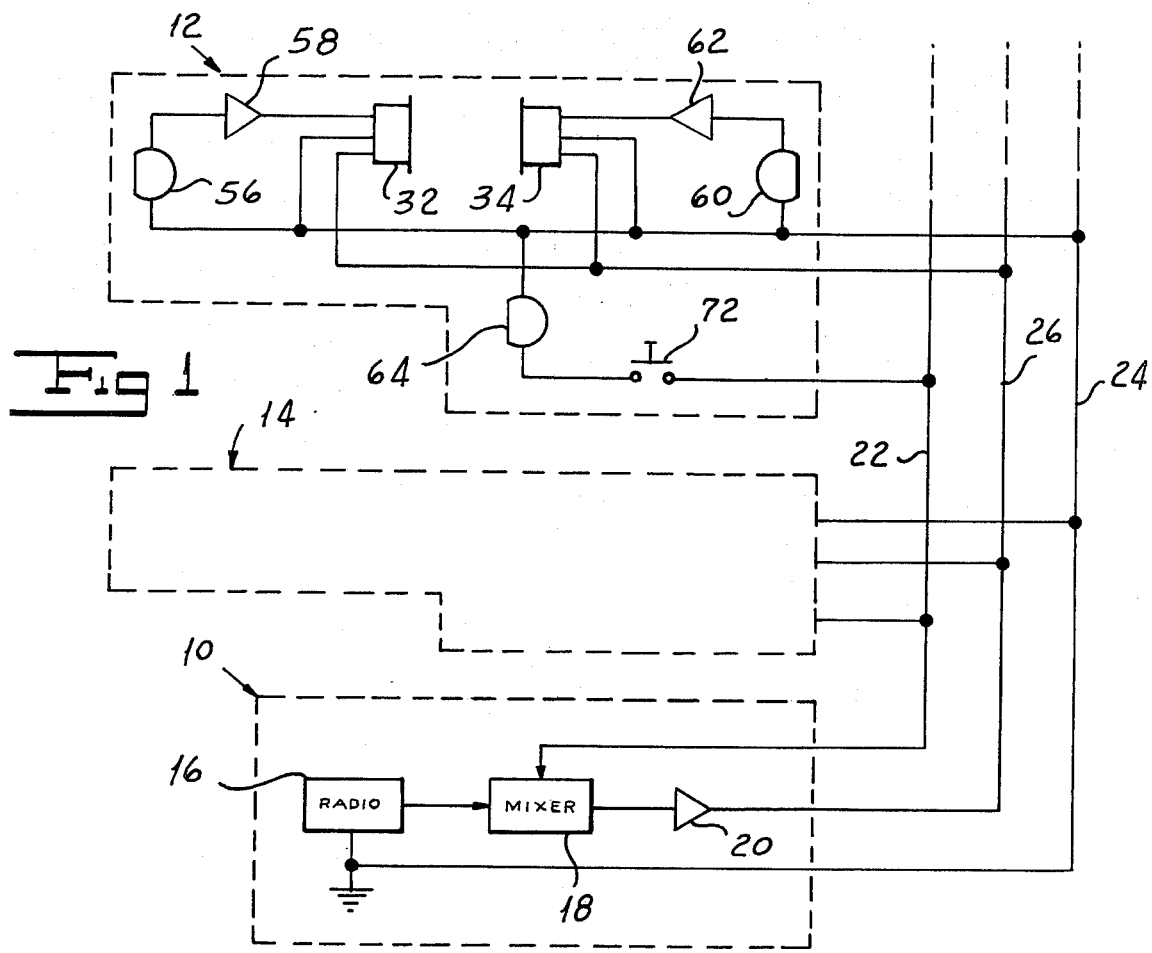
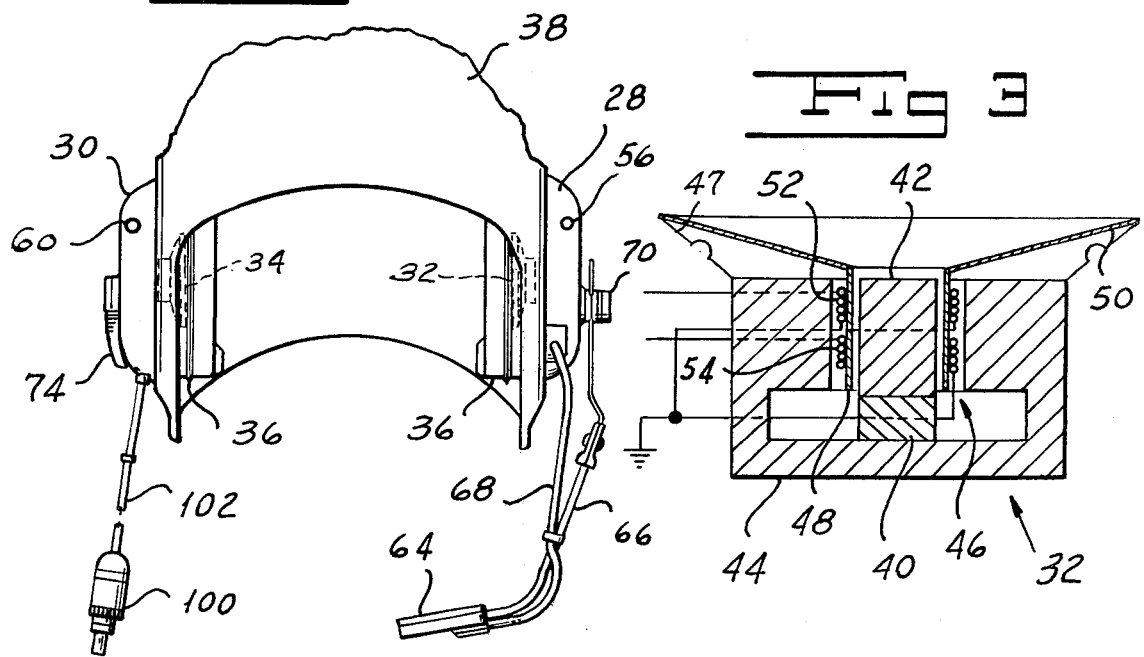

HEADSET HAVING DOUBLE-COIL EARPHONE

BACKGROUND OF THE INVENTION

Our invention relates to a headset for use in a voice communication system and, more particularly, to a headset for use in sound-attenuating earcup assemblies such as are provided for personnel employed in certain military installations having high levels of ambient noise.

There are known in the prior art sound-attenuating earcup assemblies for persons working in a high-noise environment such as the inside of an aircraft or a tank. While it is desirable that such persons be protected from the deleterious effects of the ambient noise level, it is desirable that they be in audio communication with a radio receiver or other remote signal source while at the same time being made aware of the ambient noise. In the prior art the latter is accomplished by means of local ambient sound microphones carried by the sound-attenuating earcup assemblies. Although it is generally desirable that all persons receive the same radio signal, such considerations as sound localization make it highly desirable that each person receive only the ambient sound signal produced by his own microphone. While it is possible to provide a single earphone with two signals through series resistors to provide the desired isolation, this solution necessarily results in the dissipation of large amounts of power in such resistors. Nor is a satisfactory solution provided by merely feeding the signals to different earphones of a headset, since sound localization is best accomplished by providing ambient sound signals to both earphones of the set.

SUMMARY OF THE INVENTION

One of the objects of our invention is to provide a voice communication system which allows simultaneous headset communication with a remote signal and with a local sound signal.

Another object is to provide a system which avoids interference between local sound signals of the various headsets in the system.

A further object is to provide a system which is electrically efficient.

Still another object is to provide a system allowing binaural reception of a local sound signal.

A further object is to provide a system which does not require two earphones in each earcup.

Still a further object is to provide a system which is relatively insusceptible to electronic equipment failure.

Other and further objects will be apparent from the following description.

In general, our invention contemplates a voice communication system for use with a sound-attenuating earcup assembly, which system comprises one or more headsets, each of which includes an earphone having two independently driven voice coils. One of the voice coils is coupled to an ambient sound microphone arranged to pick up sounds from the surrounding environment, while the other voice coil is coupled to the common audio signal line of a radio receiver, for example. Preferably, each headset includes two such earphones respectively mounted in the left and right sound-attenuating earcup assemblies, together with left and right ambient sound microphones for optimum sound localization.

We have found that the above-described arrangement solves all of the problems of the prior art to which we have previously referred. Each of the earphones is responsive to a composite signal which is the sum of the common audio signal and the local signal derived from the ambient sound microphone. More importantly, each earphone is responsive only to its own ambient sound microphone. Any electrical or electromechanical coupling of the two voice coil lines through the voice coil assembly in negligible. Moreover, no unnecessary power loss occurs since no isolating resistors are required. Further, the cost and bulkiness of the headsets used in our system are comparable to those of headsets using single-coil earphones. Finally, since one voice coil of each earphone is coupled directly to the common audio signal without a local mixing amplifier or the like, the system is relatively insusceptible to electronic equipment failure.

BRIEF DESCRIPTION OF THE DRAWINGS

FIG. 1 is a schematic diagram of our voice communication system.

FIG. 2 is a front elevational view of a headset used in our voice communication system.

FIG. 3 is a diagrammatic sectional view of an earphone used in our voice communication system.

DETAILED DESCRIPTION OF THE PREFERRED EMBODIMENT

Referring now to the drawings, our voice communications system includes a central station, indicated generally by the reference character 10, and a plurality of headsets, two of which, indicated generally respectively by the reference numerals 12 and 14, are shown. The central station 10 includes a radio receiver 16 for providing a common audio signal which is coupled through an audio mixer 18 to the input of a power amplifier 20. The input of amplifier 20 is also coupled through mixer 18 to a microphone signal line 22 coupled to each of the headsets 12, 14. A second line 24 running to the headsets 12, 14 is coupled to ground, while a third line 26, derived from the output of amplifier 20, provides an earphone driving signal.

Each of the headsets 12, 14 is similar to headset 12, which includes a pair of sound-attenuating earcup assemblies 28 and 30 for supporting respective left and right earphones 32 and 34 against the head of a wearer. Preferably, each of the earcups 28 and 30 is provided with a foam rubber seal 36 which assists in isolating the ear acoustically from the surrounding environment. In the embodiment shown, the earcup assemblies 28 and 30 are supported on a helmet 38 used to protect the wearer's head against ballistic impacts. It is not essential, however, that the earcups be supported by a helmet; if desired, the earcups may be supported by a wire frame or the like, leaving the wearer's head uncovered.

Each of the earphones 32 and 34 is of a dynamic type having two independently driven voice coils. More particularly, we position a permanent magnet 40 between highly permeable members 42 and 44 to produce a high-intensity magnetic field across an annular air gap 46. Any suitable resilient means indicated schematically as 47 suspends a tubular core 48 in the air gap 46. We secure one end of core 48 to a diaphragm 50. The diaphragm 50 may be driven by energizing either one of or both of a pair of voice coils 52 and 54 wound on the tubular core 48. For suitable values of magnetic field strength in the air gap 46, the diaphragm 50 responds in accordance with the sum of the signal applied to the respective voice coils 52 and 54.

We provide left earcup 28 with an ambient sound microphone 56 to allow the wearer to listen to sounds from the left side without removing the helmet 38. Microphone 56 is preferably rigidly mounted in a suitable aperture formed in the earcup so as to face outwardly to monitor ambient sounds. We couple the output of the microphone 56 to the input of our amplifier 58 mounted in the earcup 28. The output of amplifier 58 is used to drive one of the voice coils of earphone 32. The other voice coil of earphone 32 is coupled to the line 26 running from the central station 10 and carrying the common audio signal.

In a similar manner, we mount a ambient sound microphone 60 in an aperture in right earcup 30 to allow the wearer to listen to sounds from the right side. Microphone 60 provides the input of an amplifier 62 mounted in the right earcup 32. Amplifier 62 drives one voice coil of earphone 34; the other voice coil is coupled to the common audio signal line 26.

To allow two-way voice communication with the other headsets forming the system, headset 12 includes a voice microphone 64 which is supported in front of the wearer's face by means of a boom 66 adjustably secured to left earcup assembly 28 by a clamp 70. The microphone 64 is electrically connected to the headset through a cable 68. Microphone 64 is coupled to the microphone signal line 22 through a normally open "push-to-talk" switch 72 located in the right earcup 30. Actuation of a lever 74 mounted outside the earcup 30 momentarily closes switch 72 to couple the microphone 64 through mixer 18 to the amplifier 20, which provides an amplified signal on the common audio signal line 26. Suitable matching of the signal levels of the radio receiver 16 and the voice microphone 64 may be accomplished by adjusting the amplification of the respective inputs to mixer 18.

While a boom-mounted voice microphone is used in the embodiment shown, it may be preferable in certain situations to use a contact microphone urged against a suitable portion of the wearer's head such as the temple area. Such a microphone is described in detail in the copending application of applicant Leonard P. Frieder, Jr., and Jackson A. Aileo, Ser. No. 641,450, filed Dec. 17, 1975, which application is incorporated by reference.

It will be seen that we have accomplished the objects of our invention. Each earphone is responsive to a composite signal comprising a common audio signal and a second signal derived only from a local ambient sound microphone. Our system is electrically efficient since each voice coil is coupled directly to an approriate amplifier output without any isolating resistors. The cost and bulkiness of our system is comparable to those using headsets with single-coil earphones. Finally, our system is relatively insusceptible to electronic equipment failure.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A headset for use in a voice communication system having a common audio signal, comprising:
    an earphone having two voice coils and a magnet assembly common to said voice coils;
    means for supporting the earphone against the head of a wearer in acoustical communication with the ear;
    a microphone;
    means for supporting the microphone on the head of the wearer in acoustical communication with the surrounding environment;
    means for coupling the microphone to one of the voice coils; and
    means for coupling the common audio signal to the other of the voice coils.

2. A headset as in claim 1 in which said earphone supporting means comprises a sound-attenuating earcup assembly which isolates the earphone acoustically from the surrounding environment.

3. A voice communication system, comprising:
    means for providing a common audio signal; and
    a plurality of headsets, each of which includes an earphone having two voice coils and a magnetic assembly common to said voice coils, an ambient sound microphone, means for supporting said earphone against the head of a wearer in acoustical communication with the ear, means for supporting said ambient sound microphone on the head of the wearer in acoustic communication with the surrounding environment, means for coupling the microphone to one voice coil of the earphone, and means for coupling the common audio signal to the other voice coil of the earphone.

4. A voice communication system as in claim 3 in which said means for providing a common audio signal comprises a signal input, each of said headsets comprising a voice microphone, means for mounting said voice microphone in acoustical communication with the voice of the wearer, and means for coupling the voice microphone to said signal input.

5. A headset for use in a system having a common audio signal, comprising:
    a pair of sound-attenuating earcup assemblies;
    a pair of earphones respectively housed in said earcup assemblies, each of said earphones having a two voice coils and a magnetic assembly common to said voice coils;
    means for supporting said earcup assemblies against the head of a wearer with said earphones in acoustical communication with the ears;
    a pair of microphones mounted on said earcup assemblies, said microphones being oriented to receive sounds originating on the respective sides of the wearer's head;
    means for coupling each of said microphones to one voice coil of the corresponding earphone; and
    means for coupling the common audio signal to the other voice coil of each of said earphones.

* * * * *